March 22, 1938. R. MACKAY, JR 2,112,172
SEWING MACHINE LUBRICATION
Filed Nov. 30, 1935
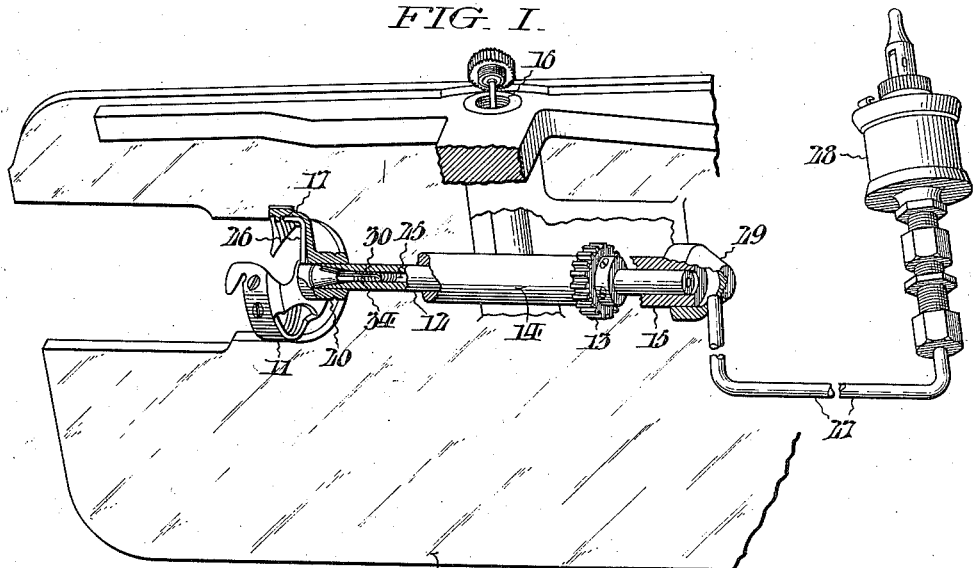
FIG. I.
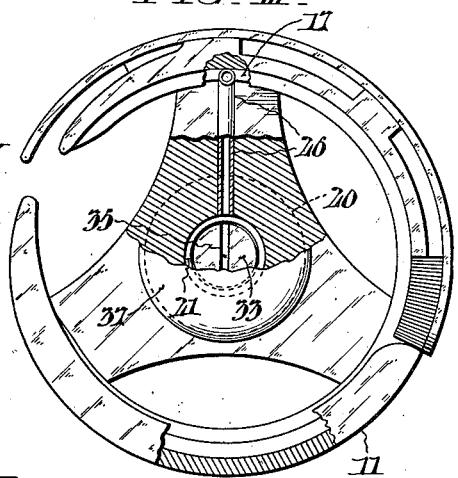
FIG. II. FIG. III.
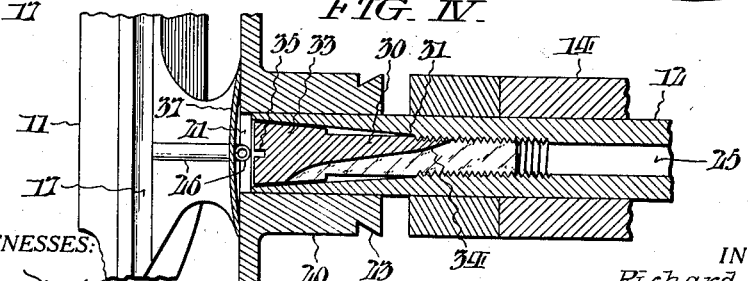
FIG. IV.
WITNESSES:
INVENTOR:
Richard Mackay, Jr.,
BY
ATTORNEYS.

Patented Mar. 22, 1938

2,112,172

UNITED STATES PATENT OFFICE 2,112,172

SEWING MACHINE LUBRICATION

Richard Mackay, Jr., Chicago, Ill., assignor to Union Special Machine Company, Chicago, Ill., a corporation of Illinois Application November 30, 1935, Serial No. 52,312

9 Claims. (Cl. 112—256)

This invention relates to sewing machine lubrication, and particularly to the lubrication of surfaces of a rotary part, especially a loop-taker or rotary hook of a lockstitch machine, for example. The invention is concerned with regulation or adjustment of the amount of lubricant supplied, and with construction of the revolving part to afford lubricant duct(s) or passage(s). However, it is to be understood that these features are also separately useful, apart from one another. Other features and advantages of the invention will appear from the following description of a species or form of embodiment, and from the drawing.

In the drawing, Fig. I is a perspective view of a rotary loop-taker or hook and associated parts,—including the work support of the machine, tilted upward and rearward,—with certain parts partly broken away and in section.

Fig. II shows a longitudinal section through the loop-taker and one end of its shaft, with a bobbin-case in the loop-taker, on a larger scale than Fig. I.

Fig. III is a view from the left of Fig. I with the bobbin-case omitted, and with part of the loop-taker structure broken away and in section.

Fig. IV is a fragmentary longitudinal section at right angles to Fig. II, taken as indicated by the line and arrows IV—IV, the bobbin-case being again omitted.

Fig. I shows a sewing machine work support 10 (tilted back), with a rotary loop-taker or hook 11 on one end of a shaft 12 beneath said work support. The shaft 12 is shown as provided with a driving gear 13 fast thereon,—which may be driven by any suitable means, not shown,—and as journaled in bearing bushings 14 and 15, which may be mounted in a suitable portion (not shown) of the work support or of the machine frame. Means for lubricating the shaft 12 in the bearing bushing 14 is generally indicated by the numeral 16. As shown in Figs. I and II, the hook 11 is of cup-like hollow form, with an internal annular raceway 17 for an external annular rib 18 of a bobbin-case 19, which may be held against rotation by any suitable means (not shown), as usual in rotary hook sewing machines. The rotary hook 11 has a hub 20 with an internal cavity or bore 21 fitting close on the end of the shaft 12, and is secured fast thereto by a set screw 22 through the side of the hub. The hub 20 is shown with a V-groove 23 adjacent its end or corner, providing an oil throw-off ridge or flange to prevent oil from the bearing sleeve 14 from working along the hub to the hook 11. As shown in Figs. I, II, and III, the end wall of the cup-like hook 11 (interconnecting its outer circumferential portion with the hub 20) is partly cut away, so that the end wall in effect consists of a plurality of spokes connecting the hub to the outer portion or rim of the hook. Suitable stitch-forming features for such a loop-taker or hook 11 are well known in the art, and form no part of my present invention; so that they need not be described.

Lubrication for the coacting surfaces of raceway 17 and bobbin-case rib 18 may be supplied through a suitable duct 25 associated with or in the shaft 12, and here shown as a concentric longitudinal bore from end to end of the shaft. One end of the shaft duct 25 delivers lubricant to the central cavity 21 of the hook 11, and thus to an outward extending duct 26 in the end and outer portions of the hook; and this duct 26 in turn delivers lubricant into one side of the hook raceway 17. Lubricant may be supplied to the shaft duct 25 from any suitable source and in any suitable way, as by means of a tube 27 leading from a lubricator cup 28 to the interior of a cap 29 secured fluid tight on the end of the bearing bushing 15.

As thus far described, the lubricating system corresponds substantially to that disclosed in the U. S. application of Clarence C. Smith, Serial No. 10,615, filed March 12, 1935.

While the lubricator 28 or other means of supply may usually be provided with means for regulating the flow of lubricant, it is preferred not to rely entirely on this, but to provide for control or regulation of the lubricant flow nearer the area requiring lubrication, preferably in the rotary hook 11, and especially at the junction of the shaft and hook ducts 25 and 26. Such localized regulation of lubricant flow is especially desirable in case any other part of the machine should be supplied with lubricant from the lubricator or other source 28, and as a protection against an oversupply of lubricant by an ignorant or careless operator,—which might result in spattering lubricant on the work being sewed. As shown in Figs. I and II, a regulating valve-plug 30 is provided for the delivery end of the shaft duct 25, so as to control the outflow of lubricant into the central hook cavity 21. As best shown in Figs. II and IV, the shaft bore 25 is enlarged to a flaring or conically tapered mouth at the end of the shaft, and the throat 31 of the shaft bore behind this flaring mouth is internally screw threaded. The valve-plug 30 has a threaded shank which screws into the throat 31 and an enlarged head end 33 for coacting with the flared mouth, preferably beveled or tapered in correspondence with the flare of the mouth. Provision may be made for relatively free passage of lubricant past the interengaged screw threads of valve-plug 30 and shaft throat 31, preferably by suitable formation or mutilation of the plug. This allows of making the screw threaded engagement of plug and throat tight enough to prevent accidental disturbance of the adjustment of the plug. As best shown in Figs. II and IV, the valve-plug 30 has a narrow slot or groove 34 (like a saw kerf) extending from the inner end of the valve-plug lengthwise thereof part way into or across the conical outer surface of the enlarged head 33. The end surface of the head 33 is shown with a diametral slot 35, for engagement by a screw driver for adjusting the valve-plug 30, by screwing it in or out in the shaft 12. Access to the valve-plug 30 for such adjustment may be had by loosening the set screw 22 and removing the hook 11 from the end of the shaft 12.

As shown in Figs. II, III, and IV, the hub duct 26 consists of a small metal tube mounted or set into a groove in the end and outer walls of the hook 11, nearly flush with their surfaces. The hub cavity 21 may be closed off from the interior of the hook 11 containing the bobbin-case 19 by any suitable means, such as a sheet metal disk 37 with its edges fitting and secured fluid tight against the end wall of the hook (and over the tube 26), as by welding.

Having thus described my invention, I claim:

1. The combination with a shaft having a lubricant duct delivering through the shaft end, and a loop-taker on said shaft end provided with a duct for receiving lubricant from said shaft duct and conveying it to an outer part of the loop-taker, of adjustable regulating valve means in said loop-taker for varying and controlling the flow of lubricant to said outer part of the loop-taker.

2. The combination with a shaft having a lubricant duct delivering through the shaft end, and a loop-taker on said shaft end provided with a duct for receiving lubricant from said shaft duct and conveying it to an outer part of the loop-taker, of regulating valve means at the junction of said shaft and loop-taker ducts for varying and controlling the flow of lubricant to said outer part of the loop-taker.

3. The combination with a shaft having a lubricant duct delivering through the shaft end, and a loop-taker removably mounted on said shaft end provided with a duct for receiving lubricant from said shaft duct and conveying it to an outer portion of the loop-taker, of a regulating valve-plug screwed into the end of the shaft, controlling the flow of lubricant from the shaft duct to the loop-taker duct, and accessible for adjustment by removal of the loop-taker from the shaft end.

4. The combination of a shaft provided with a lubricant bore having a flaring mouth at the end of the shaft and an internally screw threaded throat behind the mouth; a loop-taker removably mounted on said shaft end having a central cavity and a duct for receiving lubricant from said shaft-bore mouth and conveying it to an outer portion of the loop-taker; and a regulating valve-plug screwed into said throat having an enlarged end for coacting with said mouth, there being relatively free passage for lubricant past the interengaged screw threads of valve-plug and throat.

5. The combination of a shaft provided with a lubricant bore having a flaring mouth at the end of the shaft and an internally screw threaded throat behind the mouth; a loop-taker removably mounted on said shaft end having a central cavity and a duct for receiving lubricant from said shaft-bore mouth and conveying it to an outer portion of the loop-taker; and a regulating valve-plug screwed into said throat having an enlarged end for coacting with said mouth and formed with a passage for lubricant past the interengaged screw threads of valve-plug and throat.

6. The combination of a shaft provided with a lubricant bore having a conically flaring mouth at the end of the shaft and an internally screw threaded throat behind the mouth; a loop-taker removably mounted on said shaft end having a central cavity and a duct for receiving lubricant from said shaft-bore mouth and conveying it to an outer portion of the loop-taker; and a regulating valve-plug screwed into said throat having a conical enlarged end for coacting with said mouth, and grooved or slotted past the interengaged screw threads of valve-plug and throat and into the conical surface of its enlarged end.

7. A loop-taker having an outer wall portion or area to be lubricated, a hollow hub for receiving lubricant from a duct in the loop-taker shaft, and an end portion interconnecting said outer wall portion and said hub, with a groove at the inside of said end and outer portions extending substantially from the hollow hub to the outer wall portion to be lubricated, and a lubricant tube mounted in said groove communicating at one end with the interior of the hub and delivering to said area from its other end.

8. The combination with a rotary shaft and a loop-taker carried thereby, of a lubricant duct along said shaft also extending outward to the loop-taker raceway, and regulating means at an intermediate point of said duct for restricting and varying the cross sectional area of the duct at said point and the flow of lubricant to said raceway.

9. The combination with a rotary shaft and a loop-taker removably mounted on the shaft end, of a lubricant duct along said shaft also extending outward to the loop-taker raceway, and regulating valve means in said shaft accessible and adjustable, to restrict and vary the cross sectional area of the duct, upon removal of the loop-taker from the shaft.

RICHARD MACKAY, JR.